(12) United States Patent
Ichihara

(10) Patent No.: US 6,917,379 B1
(45) Date of Patent: Jul. 12, 2005

(54) IMAGE DATA PROCESSING SYSTEM WITH A REMOTE MEMORY DEVICE

(75) Inventor: Shintaro Ichihara, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/534,562

(22) Filed: Mar. 27, 2000

(30) Foreign Application Priority Data

Mar. 26, 1999 (JP) ............................................. 11-083572
Mar. 8, 2000 (JP) ....................................... 2000-063467

(51) Int. Cl.[7] ............................................. H04N 5/225
(52) U.S. Cl. ................................. 348/207.1; 348/211.2
(58) Field of Search ........................ 348/207.94, 207.1, 348/207.11, 207.2, 211.99, 211.1, 211.4, 211.12, 211.13, 231.1, 231.2, 231.6, 231.9, 220.1, 14.1; 386/107, 117, 118, 124, 77; 375/240, 240.16

(56) References Cited

U.S. PATENT DOCUMENTS

| | | | | |
|---|---|---|---|---|
| 5,153,730 A | * | 10/1992 | Nagasaki et al. | 348/231.6 |
| 5,751,350 A | * | 5/1998 | Tanaka | 348/231.99 |
| 5,806,005 A | | 9/1998 | Hull et al. | |
| 5,872,599 A | * | 2/1999 | Rosenbrg | 375/240.16 |
| 5,969,750 A | * | 10/1999 | Hsieh et al. | 348/14.1 |
| 6,084,911 A | * | 7/2000 | Ishikawa | 375/240 |
| 6,111,605 A | * | 8/2000 | Suzuki | 348/220.1 |

FOREIGN PATENT DOCUMENTS

| | | | |
|---|---|---|---|
| JP | 7-178974 | 7/1995 | |
| JP | 8-130619 | 5/1996 | |
| JP | 9-307794 | 11/1997 | ............ H04N/5/22 |
| JP | 10-190997 | 7/1998 | |
| JP | 10-257367 | 9/1998 | |
| JP | 11-15850 | 1/1999 | |

\* cited by examiner

Primary Examiner—Tuan Ho
(74) Attorney, Agent, or Firm—Sughrue Mion, PLLC

(57) ABSTRACT

An image data processing system includes a digital camera having an image pick-up means for conversing the light from a photographic object into the image data, an image data memory apparatus having the first memory section which can store the image data, and a communication apparatus having a communication section respectively provided in the digital camera and the image data memory apparatus, and the communication section transmitting and receiving the image data, and a communication path to which the communication section is connected, wherein the first memory section is provided with a cache area in which the stored image data is deleted at need and the new image data is stored, and a saving area in which the image data is accumulated.

10 Claims, 3 Drawing Sheets

IMAGE DATA PROCESSING SYSTEM WITH A REMOTE MEMORY DEVICE

BACKGROUND OF INVENTION

1. Field of Invention

The present invention relates to an image data processing system to process the image data photographed by a digital camera.

2. Related Art

Conventionally, a digital camera by which the light is converted into electric signals by an optical sensor such as a CCD, and the electric signals are converted into the digital data and stored in a storage medium such as a flash memory, is known. When the digital camera is used, the storing of the image data or various workings can be easily carried out by an individual using a personal computer (PC) or the like, and by outputting the image by a printer connected to a personal computer, or a printer which can be directly connected to the digital camera, the photograph can be printed without development of the film. According to the improvement of the print quality of the printer, the photograph whose quality is so high that there is almost no difference to the silver halide photograph, can also be printed.

The light inputted from the photographic object into a optical sensor such as a CCD, is converted into the digital data by an A/D converter, and after it is processed by color compensation and data compression, the digital camera stores it in the flash memory housed in the digital camera or the storage medium such as a memory card which is detachable from the digital camera, as the image data.

The number of images which can be stored in the flash memory or the memory card, which is installed in the digital camera, is about from several number of sheets to several tens of sheets, although it is changed depending on the degree of the compression of the image data, that is, the image quality. Accordingly, in order to store the more image data, it is necessary that the capacity of the flash memory housed in the digital camera is increased, however, the capacity of the flash memory which can be housed in the digital camera is limited.

Further, there is a digital camera in which a detachable memory card is installed, instead of housing the flash memory in the digital camera. However, because the cost of the memory card is high as compared to the photographic film of the silver halide camera, there is a problem that, when the large number of memory cards are purchased, the purchasing cost of the cards is increased.

Recently, by the aid of the rapid spread of note type personal computers and portable terminal equipments, and the substantiality of the communication circumstance such as the internet, by transferring the image data photographed by the digital camera to the large capacity memory section such as a disk of a server computer by using the communication line such as a telephone line, and storing it, a system by which the capacity of the memory card installed in the digital camera is suppressed to the minimum, is proposed.

However, even when the memory section of the server computer has a large capacity, the memory capacity of the memory area allotted to the user individual is limited, and when the memory area allotted to the user is full by the image data, it is necessary that the image data stored in the memory section is downloaded in the local disk of the personal computer prepared by the user individual, or the memory section of the image data memory apparatus is newly purchased. Further, there is a problem that, because the unnecessary old image data which is previously photographed is stored in the memory section, the newly photographed image data can not be stored in the memory section.

SUMMARY OF INVENTION

Accordingly, the object of the present invention is to provide an image data processing system by which the user area allotted to the memory section of the image data memory apparatus can be effectively used.

According to the image data processing system according to the first aspect of the present invention or the image data memory apparatus according to the sixth aspect of the invention, the first memory section to store the image data has a cache area and a saving area. In the cache area, when the memory capacity to store the new image data is insufficient, an area, for example, the oldest image data is stored, is made so as to be overwritten, and the memory area to store the newest image data is secured. Then, the newest image data is overwritten on the secured memory area, and is stored. On the other hand, in the saving area, the photographed image data is stored and accumulated. Accordingly, the user can store the image data which is desired to be temporarily saved, in the cache area, and the important image data which is not desired to be deleted, can be stored in the saving area, therefore, the first memory section can be effectively used.

According to the image data processing system according to the second aspect of the present invention, the user can direct to store the photographed image data in which area of the saving area and the cache area of the first memory section, from the digital camera. Accordingly, even when the user does not carry or have the processing apparatus such as, for example, the personal computer, the user can direct to the image data memory apparatus.

According to the image data processing system according to the third aspect of the present invention, because the image data stored in the first memory section of the image data memory apparatus can be reproduced by the image data display section of the digital camera, the user can view the image according to the image data stored in the first memory section even when the user does not have, for example, the personal computer, or the like.

According to the image data processing system according to the fourth aspect of the present invention, even when the image data is stored in the cache area, when it is reproduced by the digital camera, the image data can be rewritten in the saving area. Accordingly, such the important image data as reproduction is necessary is not deleted even when the image data becomes old.

According to the image data processing system according to the fifth aspect of the present invention, when the image according to the image data stored in the first memory section of the image data memory apparatus is printed by the printing section of the printing apparatus, the image data which is the original data of the printed image, is transmitted in the second memory section of the printing apparatus. Further, the printed image data, which is printed by the printing apparatus, is stored from the cache area to the saving area of the image data memory apparatus. Furthermore, because the printed image data is stored in the second memory section of the printing apparatus, when the image data is printed again, it is not necessary that the printing apparatus is connected to the image data memory apparatus.

According to the image data memory apparatus according to the sixth aspect of the present invention, there is provided output means for outputting the image data to the external printing apparatus. Thus, the image photographed by the digital camera is printed by the printing apparatus through the image data storing apparatus.

According to the image data memory apparatus according to the seventh aspect of the present invention, the duplication means is provided. Even when the image data is stored in the cache area, the duplication means rewrites the image data into the saving area when it is reproduced by the digital camera or printed by the printing apparatus. Accordingly, the so important image data as it is necessary to be reproduced or printed, can be prevented from being deleted when the image data becomes old.

DETAILED DESCRIPTION OF PREFERRED EMBODIMENTS

Figure 1:
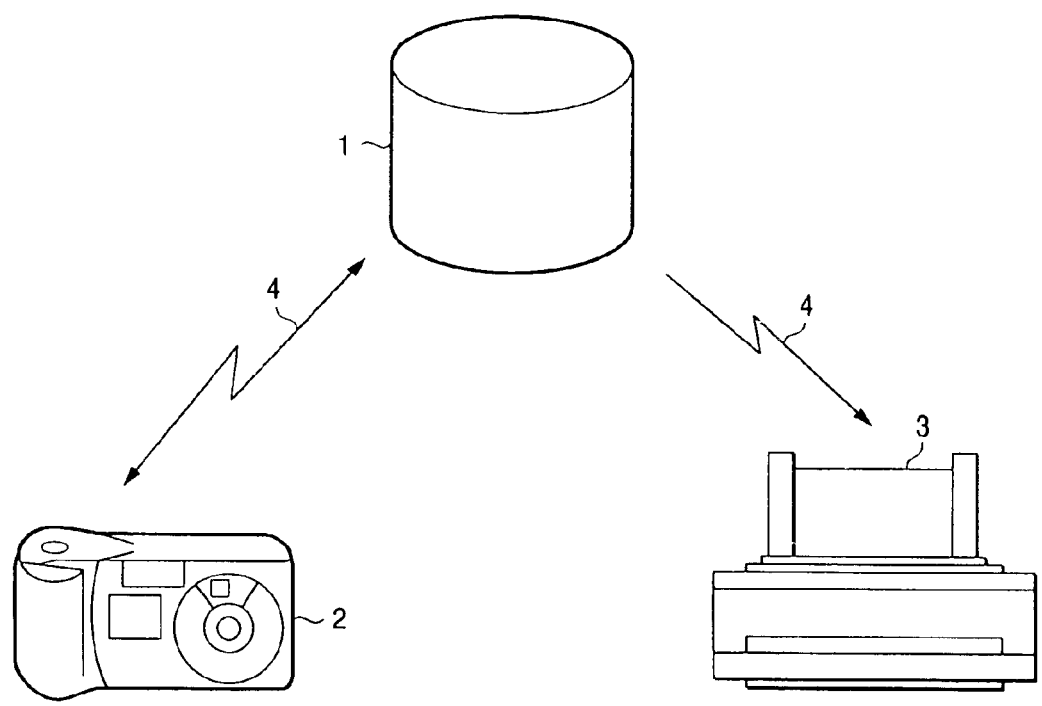
FIG. 1 is a structural view showing an image data processing system according to the embodiment of the present invention.

Hereinafter, referring to the drawings, the embodiment of the present invention will be detailed.

Figure 2:
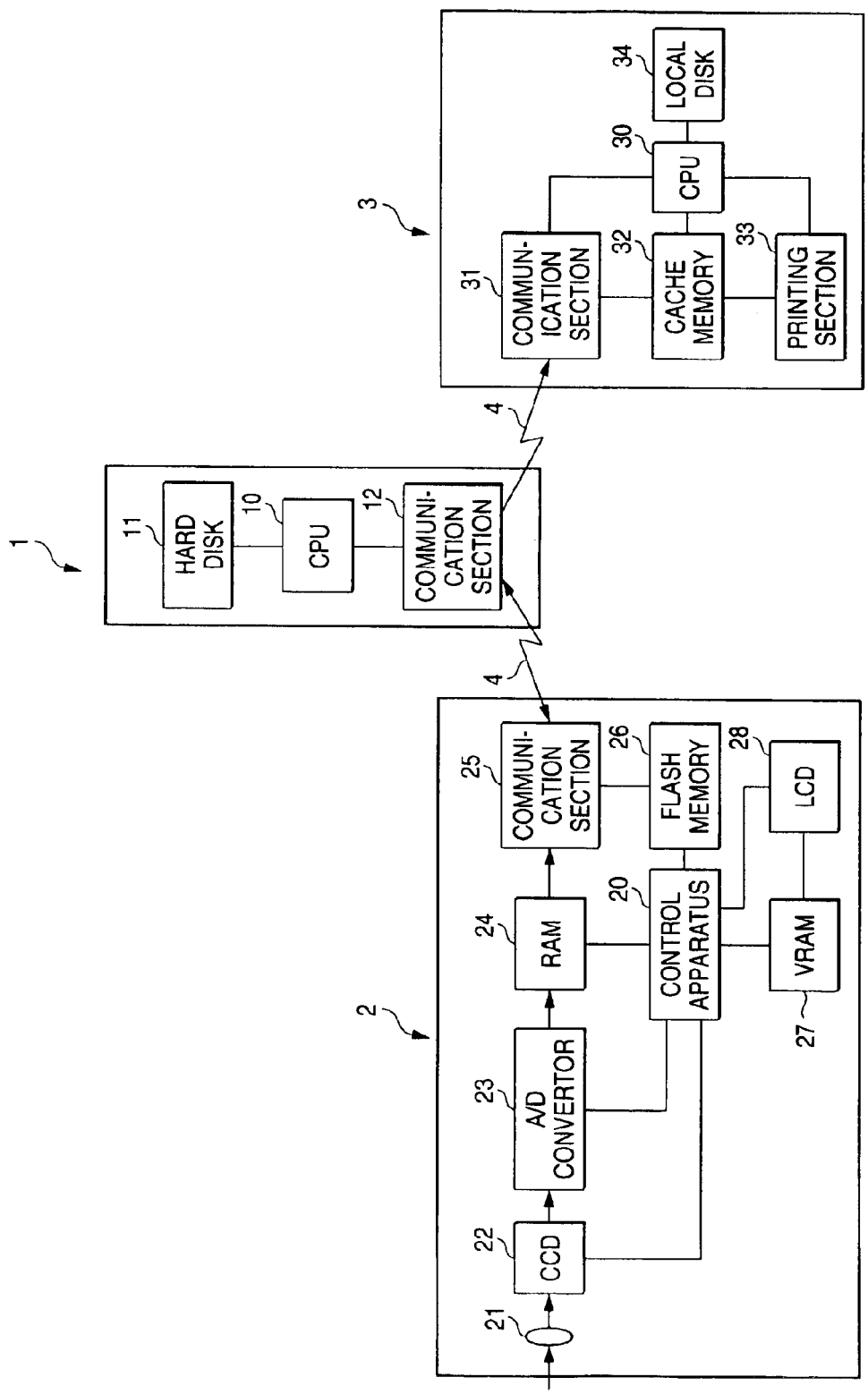
FIG. 2 is a block diagram showing the image data processing system according to the embodiment of the present invention.

The image data processing system of the embodiment of the present invention is shown in FIG. 1 and FIG. 2. As shown in FIG. 1, the image data processing system comprises: a digital camera 2 to photographs the photographic object; a server computer 1 as the image data memory apparatus provided with the large capacity memory section to store the image data of the photographic object photographed by the digital camera 2; and a printer 3 which can print the image according to the image data stored in the server computer 1.

Because the server computer 1 is arranged at a remote place from the digital camera 2 and the printer 3, it is not necessary that the user carries the image data memory apparatus to store the image data.

As shown in FIG. 2, the digital camera 2 comprises: a control apparatus 20; an image pick-up means consisting of a condenser lens 21, a CCD (Charge Coupled Device) 22, and an A/D converter 23; an LCD (Liquid Crystal Display) 28 as the image display means for displaying the image; a RAM (Random Access Memory) 24 to temporarily store the digital data of the photographed photographic object; a flash memory 26 to store the image data made by the server computer 1; a VRAM 37 in which the data for the image displayed on the LCD 28 is stored; and a communication section 25 to connect to the communication path 4 by which the digital camera 2 and the server computer 1 are connected. The control apparatus 20 is provided with the CPU, the ROM in which programs to conduct the various control of the digital camera 2 are stored, and an input means. The flash memory 26 is a nonvolatile storage medium which can store the reduction image data (thumbnail) made by the server computer 1 according to the image data.

Figure 3:
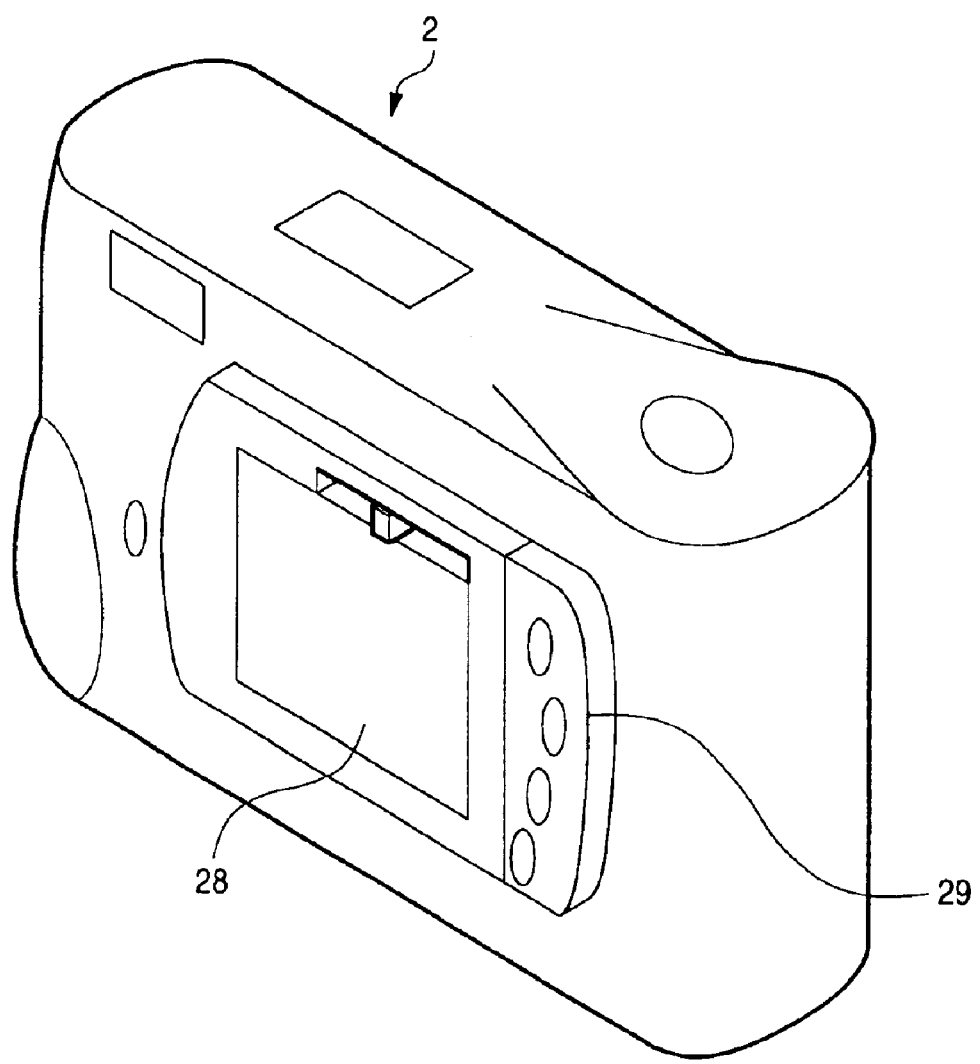
FIG. 3 is a perspective view from the rear surface showing a digital camera in the image data processing system according to the embodiment of the present invention.

The direction to the server computer 1 can be conducted by using a direction button provided at a direction section 29 as a direction means provided on the rear surface portion of the digital camera 2 as shown in FIG. 3. The content of the direction is displayed on the LCD 28, and the user can conduct the direction to the server computer 1 by operating the direction button at the direction section 29 while looking at the LCD 28.

The communication means is structured by the communication section 25 provided by being housed in the digital camera 2, the communication section 12 provided in the server computer 1, and the communication path 4 which interconnects the communication section 25 and the communication section 12. As the communication path 4, a wire transfer system using, for example, a telephone line, a wireless transfer system using a portable telephone line or an infrared rays, and a network system using Ethernet, or the like, can be used.

The server computer 1 has: a CPU 10 serving as a computer main body which can conduct the image processing and each kind of control; a hard disk 11 as the first memory section; and a communication section 12 to connect to a communication path 2 which is connected to the digital camera 2 or the printer 3. The hard disk 11 accumulates and saves a large amount of image data sent from the digital camera 2, and can be made a large amount and high speed access to it, in order to conduct data communication between the digital camera 3 and the hard disk 11 at high speed.

A part of the memory area of the hard disk 11 provided in the server computer 1 is provided to the user of the digital camera 2 as a user area. The user can set the user area of the hard disk 11 provided to the user to two memory areas of the cache area and the saving area, and use them. Further, as methods to direct in which area of the cache area and the save area the image data photographed by the user is stored, the following can be used: (1) The direction is given from the digital camera each time when the user photographs; (2) The user previously sets to the digital camera 2, in which area the image data is stored, and all the photographed image data are stored in the set area; (3) When not directed specifically, the image data is stored in the one predetermined area; and (4) When not directed specifically, the photographed image data is stored in the area in which the image data is just before stored.

The cache area is a memory area to store the image data of the photographic object which is photographed by the user using the digital camera 2, by the predetermined capacity. In the cache area, when the memory capacity is insufficient, and the newly photographed image data can not be stored, the oldest image data is deleted and the newest image data is overwritten on it, and the data in the cache area is renewed. Therefore, because the unnecessary old image data is automatically deleted, the memory area of the hard disk 11 can be effectively used, and the user can conduct the photographing by using the digital camera 2 without worrying about the memory capacity of the hard disk 11.

The saving area is an area to accumulate and save the important image data, and when the newest image data is stored, the old image data is not deleted. However, when the user judges the image data stored in the saving area to be unnecessary, the unnecessary image data can be deleted by the direction of the user to the digital camera 2.

The CPU 10 of the server 1 duplicates and rewrites the image data stored in the cache area of the hard disk 11 in the saving area in the predetermined case. Even the image data stored in the cache area of the hard disk 11, for example, when the user uses the image data in order to reproduce the image data by the LCD 28 of the digital camera 2, the used image data is rewritten from the cache area to the saving area. Accordingly, the important data referred by the user once is automatically moved to the saving area and stored in it, and even when it becomes old, the data is not deleted. However, even when the user refers to the thumbnail by the LCD 28 of the digital camera 2, the image data is not rewritten from the cache area to the saving area.

The printer 3 is directly connected to the server computer 1 through the communication means without through the personal computer, and can print an image according to the image data stored in the hard disk 11 corresponding to the direction given to the digital camera 2 or the printer 3 by the user. The printer 3 is provided with: a communication section 31 to connect to the communication path 2 connected to the server computer 1; a cache memory 32 to temporarily store the image data received from the server computer 1; a printing section 33 provided with a head for printing and a printing section; a local disk 34 as the second memory section which can store the image data whose printing is completed; and a CPU 30 to control the function of the printer 5.

When the image data stored in the hard disk 11 is printed by the printer 3, the image data downloaded from the hard disk 11 to the printer 3 is stored once in the cache memory 32. Then, each time when the printing is conducted, the image data stored in the cache memory 32 is converted into the print data by the CPU 30 of the printer 3, and the printing is conducted by the printing section 33. By storing the image data in the cache memory 32, when a plurality of images according to the same image data are continuously printed, the printing can be rapidly conducted. This is for the reason that: for example, even when the image data stored in the hard disk 11 is compressed by the method of JPEG, or the like, and its data capacity is about 100 k bytes, when it is converted into the print data to print by the printer 3, the data becomes the large data of several megabytes to several tens megabytes, although it depends on the capacity of the image to be printed, therefore, rather than in the case where the print data is formed by the server computer 1 and downloaded to the printer 3 and then printed, in the case where the image data is downloaded once from the hard disk 11 to the cache memory 32 of the printer 3 and stored, and the image data is converted into the print data by the printer 3 each time when the printing is conducted, the quicker print can be conducted.

When the printing is completed, the image data stored in the cache memory 32 is copied and stored in the local disk 34 of the printer 3, and when the same image data, stored in the hard disk 11, as the image data of the original of the printed image, is stored in the cache area, the data is stored from the cache area to the saving area. Accordingly, notwithstanding in which area of the cache area or the saving area of the hard disk 11 the image is stored, because the image data is downloaded from the hard disk 11 to the local disk 34 and stored in it each time when the printing is conducted, the image data which has so high frequency in use as it is necessary to be printed, is not deleted. Further, when the same image as the image once printed is reprinted, because the image data is saved in the local disk 34, it is not necessary to connect to the hard disk 11 of the server computer 1 and download the image data.

In the case of an individual user, the printer 3 is arranged in his home, and the printer 3 is controlled from the digital camera 2 through the communication path 4 from the separated place from the home, and can print the image data stored in the hard disk 11. Further, it is also possible that the printer 3 is arranged in a photo shop, a mini-lab, or a convenience store, and a large number of peoples can use it. As the printer 3, an inkjet printer, sublimation type printer, and laser printer can be used.

Next, processing of the image data will be described. When the photographing is conducted by using the digital camera 2, the electric signal outputted from a CCD 22 is converted into a digital signal by an A/D converter 23, and the digital data outputted from the A/D converter 23 is directly stored by appointing the address of a RAM 24, by the DMA (Direct memory Access) without through a control apparatus 20 for increasing the speed. On the digital data, each kind of image correction such as the adjustment of the white balance, interpolation processing, and color correction is conducted by the control apparatus of the digital camera 2, and the digital data is compressed by a method of JPEG (Joint Photographic Experts Group) or the like, and is formed as the image data with a small capacity (S403). JPEG is an irreversible image compression method which is commonly used, and by changing the compression rate, the image quality of the saved image can be adjusted. The formed compressed image data is transmitted to the server computer 1 outside of the digital camera 3 through the communication path 4. Herein, the digital data is not processed in the digital camera 2, and transmitted to the server computer 1, and the server computer 1 may conduct each kind of image compensation and compression on the digital data.

The user selects to store the image data whose processing is completed, in which one of the saving area or the cache area of the hard disk 11. When the user gives the direction to the digital camera 2, the direction is transmitted to the server computer 1 through the communication path 4. In the case where the image data is stored in the cache area, when the space area is not remained in the cache area, the oldest image data stored in the hard disk 11 is deleted, and after the area necessary to store the newest image data is secured, the newest image data is overwritten. When the image data is stored in the saving area, the newest image data is stored in the saving area of the hard disk 11 without deleting other image data.

When the store of the image data is completed, the server computer 1 forms a thumbnail according to the image data including the newest image data, stored in the hard disk 11, and transmits it to the digital camera 2. The thumbnail is the reduction images into which the image data stored in the hard disk 11 is reduced, and which is displayed index-like, and after the store of the image data is completed, the thumbnail is formed according to the renewed newest image data including the newly stored image data in the cache area and the saving area. The formed thumbnail including the newest image data is transmitted to the digital camera 2 by using the communication path 4, and is stored in the flash memory 26 of the digital camera 2.

Because the user can search the desired image by using the thumbnail displayed on the LCD 28 of the digital camera 2, even when a large amount of image data is stored in the hard disk 11, the user can easily search and select the desired image.

When the printer 3 prints the image according to the image data stored in the hard disk 11, the printer 3 receives the image data from the hard disk 11, and stored once the image data in the cache memory 32 provided in the printer 3. From the image data stored in the cache memory 32, the print data is formed by the CPU 30 provided in the printer 3 each time when the printing is conducted, and the printing is conducted by the printing section 33 according to the print data.

When the printing is completed, the image data stored in the cache memory 32 is stored in the local disk 34 provided in the printer 3.

As described above by the embodiment, according to the image data processing system of the present invention, the user can effectively use the memory section of the image data memory apparatus corresponding to the importance of the image data. Further, when the printing is conducted, because the image data stored in the image data memory apparatus is transmitted to the storage means of the printer and stored in it, the memory section can be effectively used.

As described above, in the present embodiment, the hard disk is used as the memory section of the server computer, however, in the data processing system of the present invention, when it is a memory section to which the high speed access can be made, and which has the large capacity, the memory section is not limited to the hard disk, but the memory section such as the magnetic disk or optical disk may be used.

Further, in the present embodiment, when the image data stored in the image data memory apparatus is printed, the direction of the printing is conducted from the digital camera, however, the direction function to conduct the direction of printing is added to the printing apparatus, and the direction may be conducted from the printing apparatus.

Further, in the present embodiment, the still image photographed by the digital camera is described, however, even when it is the moving picture, it may be processed in the same manner.

What is claimed is:

1. An image data processing system comprising:
    a digital camera having an image pick-up means for converting the light from a photographic object into the image data;
    an image data memory apparatus having the first memory section which can store the image data; and
    a communication apparatus having a communication section respectively provided in the digital camera and the image data memory apparatus, and the communication section transmitting and receiving the image data, and a communication path to which the communication section is connected,
    wherein the first memory section is provided with a cache area in which the stored image data is deleted at need and the new image data is stored, and a saving area in which the image data is accumulated.

2. The image data processing system as claimed in claim 1, wherein the digital camera has a direction means for directing in which area of the saving area and cache area the image data is stored.

3. The image data processing system as claims in claim 2, wherein the digital camera has an image display section which can display the image according to the image data.

4. The image data processing system described in claim 3, wherein the image data stored in the cache area is stored in the cache area is stored in the saving area when reproduced in the digital camera.

5. The image data processing system described in claim 1, further comprising:
    a printing apparatus including:
    a printing section printing the image according to the image data stored in the first memory section;
    a second memory section in which the image data printed by the printing section is to be stored;
    a communication section connected to the communication path;
    transmitting means for transmitting the printed image data from the first memory section to the second to the second memory section when the image according to the image data stored in the first memory section is printed by the printing section; and
    storing means for storing the printed image data stored in the saving area of the saving area of the first memory section.

6. An image data memory apparatus comprising:
    a first memory section storing the image data photographed by an outside digital camera, the first memory section having a cache area storing a new image data by deleting a stored image data at need and saving area accumulating the image data without deleting the already stored image data; and
    output means for outputting the desired image data to be printed from the first memory section to an external printing apparatus in order to print the image by the external printing apparatus in accordance with the image data stored in the first memory section,
    wherein, in the case where the image data stored in the cache area is reproduced or outputted to the printing apparatus by the digital camera, when the image data is stored in the cache area, the image data memory apparatus has a duplication means for duplicating the image data from the cache area into the saving area.

7. An image data processing system comprising:
    an image data memory apparatus which can store image data having a first memory section provided with a cache area in which the stored image data is deleted as needed and the new image data is stored, and a saving area in which the image data is accumulated,
    a digital camera having an image pick-up means for converting light from a photographic object into the image data and a direction means for directing in which area of the saving area and cache area the image data is stored, and
    a communication apparatus having a communication section respectively provided in a digital camera and the image data memory apparatus, and the communication section transmitting and receiving the image data, and a communication path to which the communication section is connected.

8. The image data memory apparatus described in claim 7, further comprising:
    an output means which outputs the desired image data to be printed from the first memory sections to an external printing apparatus in order to print the image in accordance with the image data stored in the first memory section by external printing apparatus,
    wherein, in the case where the image data stored in the cache area is reproduced or outputted to a printing apparatus by the digital camera, when the image data is stored in the cache area, the image data memory apparatus has a duplication means for duplicating the image data from the cache area into the saving area.

9. The image data processing system as set forth in claim 7, wherein the digital camera has an image display section which can display the image according to the image data from an image data memory apparatus.

10. The image data processing system as set forth in claim 7, further comprising a second memory section in which the image data printed by the printing section is to be stored and transmitting means for transmitting the printed image data from the first memory section to the second to the second memory section when the image according to the image data stored in the first memory section is printed by the printing section.

* * * * *